Figure 1:
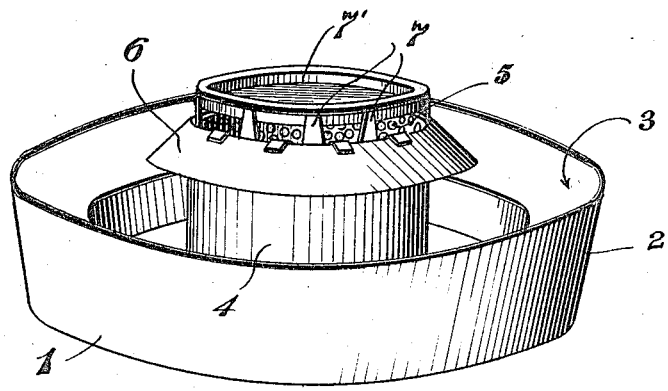

W. A. MOSBY.
INSECT TRAP.
APPLICATION FILED OCT. 3, 1916.

1,265,481.

Patented May 7, 1918.

Witness
Thos. F. Knox

Inventor
W. A. Mosby
By Victor J. Evans
Attorney

UNITED STATES PATENT OFFICE.

WILLIAM A. MOSBY, OF SAN ANTONIO, TEXAS, ASSIGNOR OF ONE-HALF TO ROBERT M. LOTHER, OF SAN ANTONIO, TEXAS.

INSECT-TRAP.

1,265,481.    Specification of Letters Patent.    Patented May 7, 1918.

Application filed October 3, 1916. Serial No. 123,550.

*To all whom it may concern:*

Be it known that I, WILLIAM A. MOSBY, a citizen of the United States, residing at San Antonio, in the county of Bexar and State of Texas, have invented new and useful Improvements in Insect-Traps, of which the following is a specification.

This invention relates to improvements in insect traps.

In carrying out my invention it is my purpose to provide a device of this character adapted for trapping ants as they attempt to emerge from or return to their burrows, and to accomplish this I propose to construct a trap including a flanged pan or receptacle that has its mouth formed with an inclined surface and which is centrally provided with a cylindrical member that communicates with the bottom thereof and which is adapted to be arranged directly over the burrow of the ants, the cylindrical member having a roughened surface and having its top provided with spaced fingers to receive a removable cap or bait pan, the said cylindrical member having a downwardly extending angularly disposed flange arranged at the juncture of the said member with the fingers thereof, whereby to direct the insects to the center of the pan or container, the said pan or container adapted to receive a quantity of liquid that is adapted to destroy the ants when the same are directed thereinto.

With the above and other objects in view the improvement resides in the construction, combination and arrangement of parts set forth in the following specification and falling within the scope of the appended claim.

Figure 2:
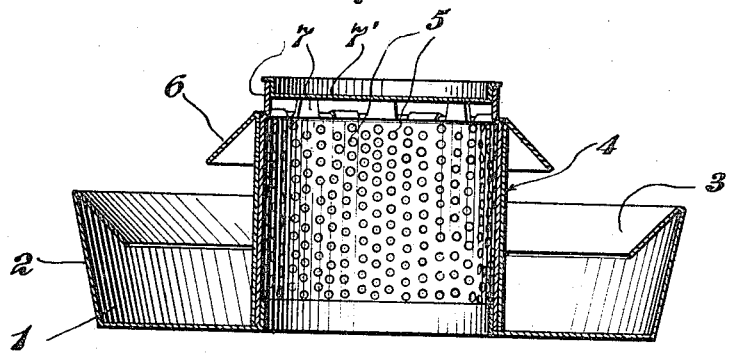

In the drawing:

Figure 1 is a perspective view illustrating a trap constructed and positioned in accordance with the present invention, and Fig. 2 is a central vertical longitudinal sectional view through the same.

As disclosed by the drawing the trap, except for the cap or bait pan therefor is preferably constructed as a single member, that is, the connected parts thereof are riveted or otherwise firmly secured without the aid of solder, so that the trap may be subjected to heat in order to destroy the ants or other insects trapped therein.

The device as also illustrated by the drawing, is adapted to be embedded in the ground so that the top edge thereof will be arranged approximately on a level with the ground and the trap is adapted to be centrally disposed directly over the burrow of the insects which it is designed to catch. The trap preferably is constructed of metal and includes a can or container 1, the same comprising a flat bottom having an upturned flange 2 which flares outwardly from the said bottom, and the top of the flange is provided with an inturned downwardly flared rim 3. The bottom of the container 1 is centrally provided with a circular opening that is closed by a cylindrical member 4, the said cylindrical member extending a considerable distance above the top of the can or container 1. The inner face of the cylindrical member or sleeve 4 is preferably provided with a ring member of reticulated material indicated by the numeral 5 and which is of a length approximately equaling that of the sleeve 4. If desired, however, instead of the reticulated ring or facing 5, the inner surface of the sleeve 4 may be roughened whereby the ants or other insects may climb through the open top of the said sleeve. The top is formed with a downwardly flared continuous flange 6, and is further provided with a plurality of spaced fingers 7 that project above the flange 6 and these fingers are adapted to receive the flanged edge of a cap or closure 7' which may be also in the nature of a bait pan.

The container 1 is adapted to receive a quantity of fluid which may be of a poisonous nature but not, however, unattractive to the smell of the insects, while still again the fluid may be in the nature of water, in which latter instance, the trap may be subjected to an amount of heat to bring the water to a boiling point to destroy the insects caught therein.

The central portion of the trap is adapted to be arranged directly over the burrow of the insects and it will be noted that when the same climb through the reticulated member in the sleeve 4 and between the openings in the spaced fingers, the insects contacting with the angular flange 6 will be directed up to the water within the pan or container 1. Likewise when the insects are returning to their burrows or are attracted by the bait in the pan, the same will be directed by the flange 3 to within the fluid in the pan or container.

From the above description it will be noted that my device is of an extremely simple nature and may be readily positioned at the proper place to trap ants or other destructive insects.

Having thus described the invention, what I claim is:

A flanged container designed to receive a poisonous fluid, said container having the inner edge of its said flange formed with a continuous inturned downwardly flared rim and the bottom of the container being centrally provided with a round opening, a cylindrical member surrounding the opening and projecting above the top of the container, a ring member of reticulated material within the sleeve and being of a length only slightly less than that of the sleeve, said sleeve at its upper portion being formed with a downwardly turned continuous flange directed toward the flange of the container, said ring at the top thereof being slitted to provide a plurality of vertically disposed fingers, and angularly disposed fingers arranged between the vertical fingers and overlying the flange at the top of the sleeve, and a flanged closure engaged and supported by the vertical fingers.

In testimony whereof I affix my signature.

WILLIAM A. MOSBY.

Copies of this patent may be obtained for five cents each, by addressing the "Commissioner of Patents, Washington, D. C."